United States Patent
Almkvist et al.

(10) Patent No.: US 10,132,043 B2
(45) Date of Patent: Nov. 20, 2018

(54) COATED SACK PAPER

(71) Applicant: BILLERUDKORSNÄS AB, Solna (SE)

(72) Inventors: Jonas Almkvist, Solna (SE); Ove Lindström, Solna (SE); Constantinos Xenopoulos, Solna (SE)

(73) Assignee: BILLERUDKORSNÄS AB, Solna (SE)

( * ) Notice: Subject to any disclaimer, the term of this patent is extended or adjusted under 35 U.S.C. 154(b) by 0 days.

(21) Appl. No.: 15/322,588

(22) PCT Filed: Jun. 24, 2015

(86) PCT No.: PCT/EP2015/064212
§ 371 (c)(1),
(2) Date: Dec. 28, 2016

(87) PCT Pub. No.: WO2016/001029
PCT Pub. Date: Jan. 7, 2016

(65) Prior Publication Data
US 2017/0130401 A1 May 11, 2017

(30) Foreign Application Priority Data
Jul. 4, 2014 (EP) .................................... 14175736

(51) Int. Cl.
| | |
|---|---|
| *B65D 30/08* | (2006.01) |
| *D21H 27/10* | (2006.01) |
| *D21H 19/20* | (2006.01) |
| *D21H 19/36* | (2006.01) |
| *D21H 19/38* | (2006.01) |
| *D21H 19/82* | (2006.01) |
| *B65D 85/00* | (2006.01) |
| *C04B 14/06* | (2006.01) |
| *C04B 28/04* | (2006.01) |
| *D21H 27/30* | (2006.01) |

(52) U.S. Cl.
CPC ............. *D21H 27/10* (2013.01); *B65D 31/02* (2013.01); *B65D 31/04* (2013.01); *B65D 85/70* (2013.01); *C04B 14/06* (2013.01); *C04B 28/04* (2013.01); *D21H 19/20* (2013.01); *D21H 19/36* (2013.01); *D21H 19/385* (2013.01); *D21H 19/82* (2013.01); *D21H 27/30* (2013.01); *B65D 2205/00* (2013.01)

(58) Field of Classification Search
CPC ...... D21H 27/10; D21H 19/385; D21H 19/82; D21H 27/30; B65D 31/02; B65D 31/04; B65D 85/70; C04B 14/06; C04B 28/04

USPC ....................................................... 428/537.5
See application file for complete search history.

(56) References Cited

U.S. PATENT DOCUMENTS

2003/0226648 A1* 12/2003 McDonnell ............. B32B 29/06
162/123
2004/0161594 A1 8/2004 Joyce

FOREIGN PATENT DOCUMENTS

| DE | 10 2010 029580 A1 | 12/2011 |
|---|---|---|
| EP | 0705710 A1 | 4/1996 |
| EP | 0 718 437 A1 | 6/1996 |
| EP | 0718437 * | 6/1996 |
| EP | 1 736 504 A1 | 12/2006 |
| EP | 1736504 * | 12/2006 |
| WO | 1994/026513 A1 | 11/1994 |
| WO | WO94/25513 * | 11/1994 |
| WO | 1998/041454 A1 | 9/1998 |
| WO | 1998/054410 A1 | 12/1998 |
| WO | WO98/54410 * | 12/1998 |
| WO | 2013/069788 A1 | 5/2013 |
| WO | WO2013/069788 * | 5/2013 |
| WO | 2013/164646 A1 | 11/2013 |
| WO | WO2013/164646 * | 11/2013 |

OTHER PUBLICATIONS

The International Bureau of WIPO, "Notification of Transmittal of Translation of the International Preliminary Report on Patentability," issued in International Application No. PCT/EP2015/064212 of which U.S. Appl. No. 15/322,588 is a U.S. national phase entry, dated Jun. 17, 2016,14 pages.
International Search Report received for PCT Patent Application No. PCT/EP2015/064212 dated Sep. 1, 2015, 4 page.
European Patent Office, "Extended European Search Report," issued in European Patent Application No. 14 175 736.9, which is a European Counterpart of U.S. Appl. No. 15/322,588, dated Jan. 7, 2015, 7 pages.

* cited by examiner

*Primary Examiner* — Leszek B Kiliman
(74) *Attorney, Agent, or Firm* — Amster, Rothstein & Ebenstein LLP

(57) ABSTRACT

There is provided a multilayered paper material for use in a valve sack for a hydraulic binder, comprising a paper layer, such as a Kraft paper layer, provided on at least one side with a pre-coating layer and a moisture barrier coating layer, wherein the pre-coating layer comprises inorganic filler and binder in a dry weight ratio of between 4:1 and 20:1.

15 Claims, 1 Drawing Sheet

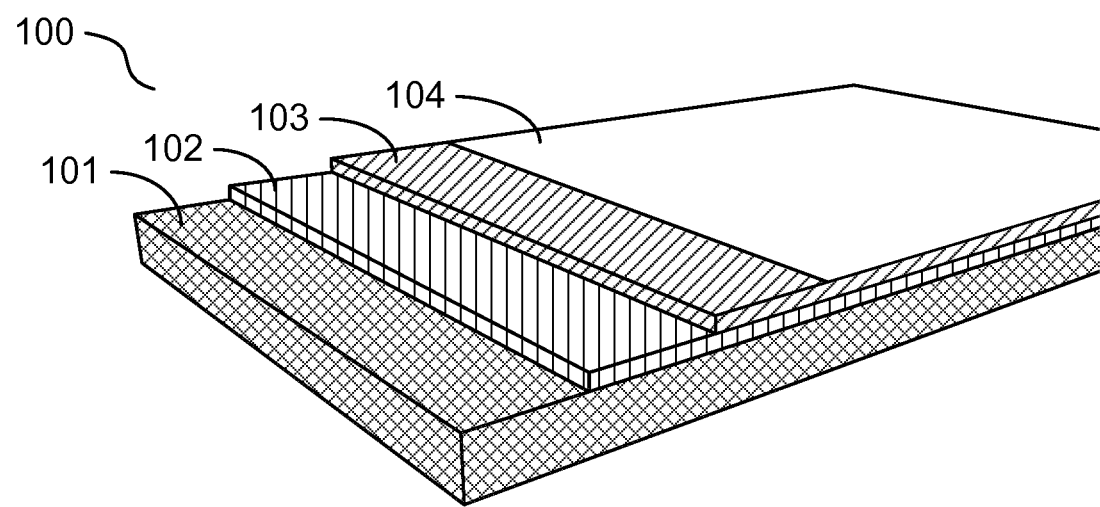

COATED SACK PAPER

TECHNICAL FIELD

The invention relates to coating of sack paper.

BACKGROUND

During filling and storage of powdery material, such as cement, paper sacks are required to meet high standards.

Firstly, the paper sacks need to hold a considerable material weight, i.e. have high tensile strength. For this purpose, Kraft paper is a suitable sack wall material. The sacks typically have two or more walls, i.e. layers of paper material, to further strengthen the sack construction. A wall layer of a sack is often referred to as a ply. Production of ply material (i.e. sack paper) is for example disclosed in WO 99/02772.

Secondly, a material such as cement is sensitive to moisture contamination during storage. Hence, cement sacks often require protection against atmospheric water vapor penetration through the sack plies. Such protection is often achieved by a moisture barrier incorporated as an intermediate layer in the sack, i.e. between two plies of the paper material. The moisture barrier is typically a plastic film ("free film"), e.g. of polyethylene (PE), that is impermeable to water. The free film may also improve resistance to grease and prevent contamination by microorganisms.

Thirdly, the paper sack should vent air during filling. In detail, the air that accompanies the powdered material shall efficiently vent from the sack as the filling machines that delivers the material run at high throughput rates. Often, the venting capability of the sack is the actual limiting for the filling rate. Efficient venting also prevents that air is trapped in the sack and causes under-weight packs, sack rupture and problems when sacks are stacked for transportation.

During the filling process, the only way for air to escape from the interior of the sack has, in many sack constructions, been through the walls of the sack. Kraft paper of high porosity is often used in the walls to facilitate air permeability. However, an increased porosity of the paper normally results in a decrease in the overall strength. In particular, the strength may be significantly reduced if holes must be made in the paper material to achieve sufficient air permeability. Furthermore, the use of a free film may reduce deaeration during filling, since most such films are impermeable to air. Therefore, the free film layers have been provided with slits or openings to facilitate deaeration.

Traditionally, construction workers have opened the cements sacks and added their contents to a mixer. However, some alternative solutions have been suggested.

GB2448486 discusses a dissolvable bag made from paper or another soluble materials, to contain building materials requiring mixing, such as cement, lime or plaster. It is stated that the dissolvable bag can be directly added to the mixer where the bag rapidly dissolves when water is added, which reduces spillage, wastage, mess and exposure to the building products. The packs are placed together in a waterproof wrapping to ensure the product stays dry whilst stored or in transit. However, no moisture barrier in the bags is discussed.

WO 2004052746 suggests spray or dip-coating the whole exterior of already filled bags with a non-permeable, waterproof coating. It is further suggested to place the bag in a mixer also containing a quantity of water, wherein resulting ingress of water into the bag causes a water-soluble inner layer of the bag to dissolve, thereby allowing the waterproof exterior of the bag to disintegrate within the mix. WO 2004052746 fails to device any materials for the inner and outer layer of the bag.

US 2011/0315272 states that a sack that dissolves in a moist environment can be obtained by using a dextrin adhesive for gluing the folded ends of the sack. Folding and gluing patterns for the ends are also discussed. A moisture barrier in the sack is not discussed.

JP5085565A suggests that a cement sack that can be added directly to a mixer is composed of a water soluble material, such as PVOH, having a thickness of 20-70 μm. FR2874598 discloses a similar solution.

SUMMARY

The present inventors have addressed the need for a disintegratable paper sack, i.e. a paper sack that can be added together with its contents, such as cement, to a mixer and then disintegrates in the mixer to such a degree that the product in the mixer is not markedly impaired.

Accordingly, it would not be necessary to open such a sack and empty its contents into the mixer. As the sacks are heavy and the contents dusty, the working environment of construction workers could be significantly improved.

Further, the inventors have realized that disintegratable sacks cannot have a polyethylene free film as such a film fails to sufficiently disintegrate in the mixer. The inventors have concluded that the moisture barrier should instead be provided by a coating on at least one of the paper plies, preferably the outermost ply, of the sack.

However, the tested barrier chemicals coated on the paper significantly reduced the disintegratability. It was hypothesized that the reduced disintegratability was caused by high penetration of barrier chemicals into the paper and therefore, it was decided to apply a pre-coating providing boundary layer between the paper and the barrier layer that minimized contact between the barrier chemicals and the paper. The inventors found that a pre-coating comprising inorganic filler not only facilitated disintegration, it also reduced the amount of expensive barrier chemicals needed to obtain an efficient moisture barrier. Without being bound by any specific scientific theory, it is speculated that the smother surface provided by the pre-coating improved the film-formation and barrier functionality of the barrier chemicals.

It is thus an object of the present disclosure to provide a barrier coated sack paper that, when used for a ply in a filled sack that is added to a cement mixer together with the sack contents and water, disintegrates in the cement mixer to such a degree that the desired properties of the product in the cement mixer are not significantly impaired.

The following itemized listing presents various embodiments of the present disclosure as well as their combinations.

1. A multilayered paper material for use in a valve sack for a hydraulic binder, comprising a paper layer, such as a Kraft paper layer, provided on at least one side with a pre-coating layer and a moisture barrier coating layer, wherein the pre-coating layer comprises inorganic filler and binder in a dry weight ratio of between 4:1 and 20:1.
2. The multilayered paper material according to item 1, wherein the inorganic filler comprises or consist of $CaCO_3$ pigment.
3. The multilayered paper material according to item 1 or 2, wherein the inorganic filler to binder dry weight ratio is between 5:1 and 20:1, such as between 5.5:1 and 15:1, such as between 6:1 and 13:1, such as between 6.5:1 and 11:1.
4. The multilayered paper material according to any one of items 1-3, wherein the inorganic filler accounts for at least 70%, such as at least 80%, such as at least 83%, of the dry weight of the pre-coating layer.
5. The multilayered paper material according to any one of items 1-4, wherein the particle size (%<2 μm) of the inorganic filler is less than 80, such as between 40 and 80, such as between 40 and 70, such as between 50 and 70.
6. The multilayered paper material according to any one of items 1-5, wherein the paper layer is formed from a paper material and one or both surface(s) of the paper material has/have a Cobb 60 S value (ISO 535) of at least 50 g/m$^2$, such as at least 60 g/m$^2$, such as at least 70 g/m$^2$, such as between 75 and 110 g/m$^2$.
7. The multilayered paper material according to any one of items 1-6, wherein the paper layer is formed from a paper material having a Gurley porosity (ISO 5636/5) of 2-15 s, such as 2-12 s, such as 2-10 s, such as 4-8 s, such as 4-7 s, such as 5-6 s.
8. The multilayered paper material according to any one of items 1-7, wherein the paper layer is obtained from bleached pulp.
9. The multilayered paper material according to any one of items 1-8, wherein the coat weight of the pre-coating is 5-12 g/m$^2$, such as 6-10 g/m$^2$.
10. The multilayered paper material according to any one of items 1-9, wherein the binder comprises a synthetic rubber, such as styrene-butadiene rubber, and/or starch.
11. The multilayered paper material according to any one of items 1-10, wherein the synthetic rubber is provided in the form of latex.
12. The multilayered paper material according to any one of items 1-11, wherein the pre-coating layer comprises a thickening agent, such as CMC.
13. The multilayered paper material according to any one of items 1-12, wherein the coat weight of the barrier coating layer is 5-15 g/m$^2$, such as 6-12 g/m$^2$, such as 7-9 g/m$^2$.
14. The multilayered paper material according to any one of items 1-13, wherein water vapor transmission rate (ISO 2528) is less than 1400 g/m$^2$*24 h, such as 700-1200 g/m$^2$*24 h.
15. The multilayered paper material according to any one of items 1-14, wherein the barrier coating layer comprises a synthetic rubber, such as styrene-butadiene rubber.
16. The multilayered paper material according to any one of items 1-15, wherein the barrier coating layer comprises a platy clay, such as platy kaolin.
17. The multilayered paper material according to any one of items 1-16 having one coated surface and one uncoated surface, wherein:
the Cobb 60 value of the uncoated surface is at least 50 g/m$^2$, such as at least 60 g/m$^2$, such as at least 70 g/m$^2$, such as between 75 and 110 g/m$^2$; and/or
the Cobb 60 value of the coated surface is at least 35 g/m$^2$, such as at least 40 g/m$^2$, such as at least 45 g/m$^2$.
18. A multiple-ply valve sack for a hydraulic binder, such as cement, wherein at least one ply, such as an outer ply, is composed of the multilayered paper material according to any one of items 1-17.
19. The multiple-ply valve sack according to item 18, wherein the outer ply is composed of the multilayered paper material according to any one of items 1-16 and the coated surface of the multilayered paper material faces inwards.
20. The multiple-ply valve sack according to item 18 or 19 comprising an inner ply and an outer ply, wherein the outer ply is composed of the multilayered paper material according to any one of items 1-17 and wherein the inner ply and the paper layer of the outer ply are composed of the same paper material.
21. The multiple-ply valve sack according to anyone of items 18-20 comprising a top end formed by folding and gluing the ply material, wherein a portion of the top end is not sealed by gluing such that air may escape through the non-sealed portion during filling of the sack with the hydraulic binder.
22. A method of producing a multilayered paper material for use in a valve sack for a hydraulic binder, comprising the steps of:
a) providing a paper layer, such as a Kraft paper layer;
b) applying a pre-coating composition onto the paper layer to form a pre-coating layer;
c) applying a barrier coating composition onto the pre-coating layer to form a barrier layer,
wherein the pre-coating layer comprises inorganic filler and binder in a dry weight ratio of between 4:1 and 20:1.
23. The method according to item 22, further comprising the step: d) calendering the coated material from step c).
24. The method according to item 22 or 23, wherein step a) and/or step b) is/are carried out by means of blade coating.
25. The method according to any one of items 22-24, wherein the viscosity of the pre-coating composition is between 400 and 1000 cP.
26. The method according to any one of items 22-25, wherein the pH of the pre-coating composition is between 70.8 and 8.8.
27. The method according to any one of items 22-26, wherein the paper layer is subjected to crêping before step a).
28. Use of a sack according to any one of items 18-21 to produce a hydraulic composition, such as concrete.
29. The use according to item 28, wherein the sack contains a hydraulic binder, aggregates and/or mineral additions.
30. A process for the production of a hydraulic composition comprising mixing water, aggregates and a hydraulic binder, wherein a sack according to any one of items 18-21 is used, which sack contains the hydraulic binder and optionally the aggregates.

BRIEF DESCRIPTION OF THE DRAWINGS

FIG. 1 shows an embodiment of a multilayered paper material according to the present disclosure.

DETAILED DESCRIPTION

As a first aspect of the present disclosure, there is provided a multilayered paper material 100 for use in a valve sack for a hydraulic binder, comprising a paper layer 101, such as a Kraft paper layer, provided on at least one side with a pre-coating layer 102 and a moisture barrier coating layer 103. Preferably, only one side of the paper layer 101 is coated with the pre-coating layer 102 and the moisture barrier coating layer 103.

The paper layer may for example be derived from pulp comprising at least 50% softwood pulp, such as at least 75% softwood pulp, such as at least 90% softwood pulp.

The pre-coating layer comprises inorganic filler and binder in a dry weight ratio of between 4:1 and 20:1. Preferably, the inorganic filler to binder dry weight ratio is between 5:1 and 20:1, such as between 5.5:1 and 15:1, such as between 6:1 and 13:1, such as between 6.5:1 and 11:1. If the ratio is too high, the binder fails to bind the filler. If the ratio is too low, the disintegratability will be negatively affected as a relatively large amount of binder will penetrate the paper layer and bind the fibers. Another drawback of high proportion of binder is increased cost as the binder is generally much more expensive than the filler.

The pre-coating may comprise other components than inorganic filler and binder, but preferably, the inorganic filler accounts for at least 70%, such as at least 80%, such as at least 83%, of the dry weight of the pre-coating layer. Examples of other (optional) components of the pre-coating layer are thickening agents, coloring agents, optical brightening agents, anti-foaming agents. One embodiment of the pre-coating comprises carboxymethyl cellulose (CMC), which is a thickening agent.

Preferably, the particles of the inorganic fillers are relatively large. Coarser particles means lower specific surface, which in turn enables a lower proportion of binder in the pre-coating. Further, filler products with coarser particles are generally cheaper. The particle size of filler and pigment is often expressed as the weight proportion of particles having a particle size below 2 µm. The value (%<2 µm) is often measured using the particle size analyzer SediGraph 5100 (Micromeritics®).

When filler/pigment is used in coatings to improve printing properties, the particle size value (%<2 µm) is generally above 80. In contrast, the particle size value (%<2 µm) of the inorganic filler of the present disclosure is preferably 80 or lower, such as between 40 and 80. In some embodiments, the particle size value (%<2 µm) is between 40 and 70, such as between 50 and 70.

The inorganic filler may for example comprise or consist of $CaCO_3$ pigment. Other types of filler are generally more expensive.

An example of a suitable filler product is Hydrocarb® 60-ME 78% (Omya AB).

The binder of the pre-coating may for example be rubber, such as a synthetic rubber, or starch. Synthetic rubbers are preferred as they are generally more efficient binders and can therefore be provided in lower proportions. One specific example of a synthetic rubber is styrene-butadiene rubber.

When preparing the pre-coating composition, the synthetic rubber is normally provided in the form of latex.

The coat weight of the pre-coating may for example be 5-12 $g/m^2$, such as 6-10 $g/m^2$. If the coat weight of the pre-coating is too low, the pre-coating may fail to form a weak boundary layer between the paper layer and the moisture barrier coating layer. Another drawback of too little pre-coating may be that higher amounts of barrier chemicals, which are expensive, are needed in the next coating layer to obtain a sufficient moisture barrier. If the coat weight of the pre-coating is too high, the cost of the product will be unnecessarily high.

In embodiments of the present disclosure, the barrier coating layer comprises a synthetic rubber, such as styrene-butadiene rubber. When preparing the barrier coating composition, the synthetic rubber is normally provided in the form of latex.

In alternative or complementary embodiments of the present disclosure, the barrier coating layer comprises a platy clay, such as platy kaolin, such as hyper-platy kaolin.

A specific example of hyper-platy kaolin is the product Barrisurf (Imerys).

In a preferred embodiment, the moisture barrier coating layer comprises both the synthetic rubber and the platy clay. For example, the synthetic rubber and the platy clay may account for at least 50%, such as at least 75 or 85%, of the dry weight of the moisture barrier coating layer. The dry weight ratio of platy clay to synthetic rubber may for example be between 1:1 and 2:1.

The coat weight of the moisture barrier coating layer may for example be 5-15 $g/m^2$, such as 6-12 $g/m^2$, such as 7-9 $g/m^2$. If the coat weight is too low, the moisture barrier coating layer may fail to provide a sufficient moisture barrier. If the coat weight is too high, the cost of the product will be unnecessarily high. It is notable that the moisture barrier chemicals are generally relatively expensive.

The moisture barrier properties may be considered to be sufficient when the water vapor transmission rate (WVTR, ISO 2528) is less than 1400 $g/m^2*24$ h, preferably less than 1200 $g/m^2*24$ h. For example, the WVTR of the multilayered paper material of the present disclosure may be 700-1200 $g/m^2*24$ h.

The inventors have realized that bleaching of the pulp increases the disintegratability. Therefore, the paper layer of the multilayered paper material of the present disclosure is preferably composed of white paper made from bleached pulp. To obtain sufficient strength, bleached sulphate pulp is preferred. The grammage of the paper layer is preferably 50-140 $g/m^2$. Generally, it is preferred to add another paper ply in a sack instead of increasing the grammage of the paper layer above 140 $g/m^2$. Preferably, the grammage of the paper layer is 50-130 $g/m^2$, such as 60-120 $g/m^2$, such as 60-110 $g/m^2$, such as 70-110 $g/m^2$.

Paper properties are often measured in the machine direction (MD) and in the cross direction (CD), since there may be significant differences in the properties, depending on the orientated fibre flow out of the headbox on the paper machine.

If the index of a certain property is needed, it should be calculated by dividing the actual value with the grammage for the paper in question.

The grammage (sometimes referred to as basis weight) is measured by weight and surface area. Suitable grammages of the paper layer of the multilayered material of the present disclosure are discussed above.

The tensile strength is the maximum force that a paper will withstand before breaking. In the standard test ISO 1924/3, a stripe of 15 mm width and 100 mm length is used with a constant rate of elongation. The tensile strength is one parameter in the measurement of the tensile energy absorption (TEA). In the same test, the tensile strength, the stretch and the TEA value are obtained.

TEA is sometimes considered to be the paper property that best represents the relevant strength of the paper sack wall. This is supported by the correlation between TEA and drop tests. By dropping a sack the filling goods will move when reaching the floor. This movement means a strain on the sack wall. To withstand the strain, the TEA should be high, which means that a combination of high tensile strength and good stretch in the paper will then absorb the energy.

Crêping of the paper improves stretchability and thereby the TEA index. Accordingly, the paper layer of the multi-layered paper material of the present disclosure may be creped.

In embodiments of the present disclosure, the tensile energy absorption index (ISO 1924-3) of the multilayered paper material may for example be at least 1.8 J/g, such as at least 2 J/g, such as at least 2.2 J/g, in both the machine direction (MD) and the cross direction (CD). Further, tensile index of the multilayered paper material of the present disclosure may for example be at least 50 kNm/kg (ISO 1924/3), such as at least 60 kNm/kg, in the machine direction (MD) and at least 35 kNm/kg, such as at least 38 kNm/kg, in the cross direction (CD).

The air resistance according to Gurley (ISO 5636/5) is a measurement of the time (s) taken for 100 ml of air to pass through a specified area of a paper sheet. Short time means highly porous paper.

The inventors have realized that porosity is an indicator of a paper's disintegratability.

Further, it may be preferred from an economical perspective to use the same type of paper in the inner and the outer plies of a sack, with the only difference that the outer ply is coated. Accordingly, all the paper needed for a sack may be produced with a single paper making process. Then, the paper intended for the outer ply of the sack is coated to obtain according to the present disclosure. In conclusion, it may be beneficial if the paper layer used for the multilayered paper material of the present disclosure has such a Gurley value that it may be used for an inner or middle ply of a multiple ply valve sack.

In embodiments of the present disclosure, the paper layer may thus be formed from a paper material having a Gurley porosity (ISO 5636/5) of 2-15 s, such as 2-12 s, such as 2-10 s, such as 4-8 s, such as 4-7 s, such as 5-6.5 S.

The Cobb value (ISO 535) represents the amount of water absorbed by a paper surface in a given time. The most commonly employed Cobb value is Cobb 60, wherein the time is 60 sec. The inventors have found that higher Cobb values generally correlates with better disintegratability. Higher Cobb values may for example be obtained by delignifying/bleaching the pulp as discussed above.

The multilayered paper material of the present disclosure preferably has an uncoated side/surface, wherein the Cobb 60 value of the uncoated side/surface is at least 50 g/m$^2$, such as at least 60 g/m$^2$, such as at least 70 g/m$^2$, such as between 75 and 110 g/m$^2$. Further, the Cobb 60 value of a coated surface of the multilayered paper material of the present disclosure is preferably as at least 35 g/m$^2$, such as at least 40 g/m$^2$, such as at least 45 g/m$^2$.

The paper layer of the multilayered paper material of the present disclosure may be formed from a paper material having a Cobb 60 S value (ISO 535) of at least 60 g/m$^2$, such as at least 70 g/m$^2$, such as at least 80 g/m$^2$, such as between 80 and no g/m$^2$ for both sides/surfaces.

There is also provided a valve sack for a hydraulic binder, such as cement, wherein at least one ply is composed of the multilayered paper material according to the first aspect. The ply composed of the multilayered paper material of the first aspect is preferably the outermost ply of a multiple-ply valve sack. In one embodiment, the outermost ply comprises one coated side/surface which faces inwards. Such an orientation of the outermost ply may facilitate efficient gluing as it is generally easier to glue two uncoated surfaces to each other. Another benefit of such an orientation is that the barrier is protected from damage. In another embodiment, the outermost ply comprises one coated side/surface which faces outwards. A benefit of such an embodiment is that the coating may provide protection against rain.

The porosity of the multilayered paper material of the present disclosure is too low to allow sufficient air penetration through it during filling. Therefore, the sack is preferably designed to provide another path for escaping air during filling.

One embodiment of the valve sack of the present disclosure therefore comprises a top end formed by folding and gluing the ply material such that a portion of the top end is not sealed by the gluing. In such an embodiment, the folding and gluing is such that air may escape through the non-sealed portion during filling of the sack with the hydraulic binder. Preferably, the sack is designed such that air penetrates the innermost ply and then escapes through the non-sealed portion during filling at high throughput rates.

In one embodiment, wherein the valve sack comprises an inner ply and an outer ply, the outer ply is composed of the multilayered paper material according to the first aspect and the inner ply and the paper layer of the outer ply are composed of the same paper material. The benefits of such an embodiment are discussed above.

As a second aspect of the present disclosure, there is provided a method of producing a multilayered paper material for use in a valve sack for a hydraulic binder, comprising the steps of:

a) providing a paper layer, such as a Kraft paper layer;
b) applying a pre-coating composition onto the paper layer to form a pre-coating layer; and
c) applying a barrier coating composition onto the pre-coating layer to form a barrier layer.

The pre-coating layer comprises inorganic filler and binder in a dry weight ratio of between 4:1 and 20:1.

The embodiments of the first aspect apply to the second aspect mutatis mutandis.

The pre-coating composition and the barrier coating composition are preferably aqueous compositions. For example, they may comprise latex, as discussed above. Further, one of or both compositions may be applied by means of blade coating. To facilitate blade coating, the pre-coating composition may have a viscosity of between 400 and 1000 cP, such as between 450 and 950 cP (measured according to Scan-P 50:84, but with a sample temperature of 34-40° C.). A thickening agent, such as CMC or a synthetic thickening agent, may be added to the pre-coating composition in an amount that gives the desired viscosity. The skilled person is capable of finding such an amount. Further, the pre-coating may for example have a pH of 70.8-8.8, such as 8.0-8.6. Such a pH is particularly preferred when the inorganic filler is $CaCO_3$. The pH may be adjusted with alkali, such as NaOH.

As indicated above, the paper layer of the second aspect may for example be subjected to crêping before step a).

In one embodiment of the second aspect, the method further comprises the step:

d) calendering the coated material from step c).

Step d) improves the film-forming of the barrier layer. Calendering is also known to improve printability.

It could be suspected that calendering would force the barrier chemicals into the fibre structure of the paper layer and thereby reduce disintegratability, but the inventors have found that the multilayered paper material of the present disclosure is disintegratable also after calendering. Accordingly, it appears as if the pre-coating layer withstands the forces of the calendering operation.

As a third aspect of the present disclosure, there is provided a use of a sack according to the above to produce a hydraulic composition. In an embodiment of the third aspect, the sack contains a hydraulic binder and/or aggregates. The sack may also contain mineral additions.

A hydraulic composition generally comprises a hydraulic binder, water, aggregates and admixtures. The aggregates include coarse aggregates and/or sand. They may be a mineral or organic material. They may also be of wood or recycled materials or with a base of waste material. A sand is generally an aggregate having a particle size less than or equal to 4 mm. Coarse aggregates are generally aggregates having a particle size greater than 4 to, for example, 20 mm.

A hydraulic binder comprises any compound which sets and hardens by hydration reactions. The hydraulic binder comprises, for example cement, plaster or hydraulic lime. Preferably, the hydraulic binder is a cement.

Accordingly, the sack according to the third aspect preferably contains a hydraulic binder, such as cement, aggregates and/or mineral additions.

The sack used according to the third aspect is generally a sack of a material that is sufficiently resistant to make it possible to fill the sack with a particulate material, to handle and transport the filled sack, and at the same time have a nature and a structure such that it dissolves, disperses or disintegrates in water, preferably rapidly, during the production of a hydraulic composition. Preferably, the sack dissolves, disperses or disintegrates in water by the effect of mechanical mixing. The difference between the solubility and the dispersibility is that, in the latter case, small pieces of the sack remain intact (for example particles or fibres), but without having a significant negative effect when the hydraulic composition is used. A disintegratable sack is generally made of a material which loses its cohesion during the mixing.

Preferably, the sack of the present disclosure comprises one or more characteristics selected from the following list:
  sufficient mechanical properties to contain 5 to 50 kg of particulate materials;
  cold disintegration (no heating required for the disintegration);
  disintegration by the effect of a mixing action; and
  sufficient impermeability to gases, for example to oxygen in the air and to carbon dioxide. This impermeability is in particular important during storage of the sacks, reducing to a minimum the ageing of the particulate materials contained in the sack.
Preferably, the sack has all the characteristics listed above.

Preferably, the sack of the third aspect is disintegrated in less than 70 revolutions of the blade in a concrete mixer.

Preferably, at least 80% by mass of the sack is disintegrated in the concrete mixer in 10 minutes or less, such as 6 minutes or less.

Similar to the third aspect, there is provided a process for the production of a hydraulic composition comprising mixing water, aggregates and a hydraulic binder, wherein a sack according to the above, which contains the hydraulic binder and/or the aggregates, is used.

The process for the production of the hydraulic composition may for example comprise the following steps:
  a. introduction of water and aggregates in a concrete mixer;
  b. introduction of a hydraulic binder; and
  c. optionally introduction of mineral additions and/or other admixtures;
in which the sack is introduced during step a and/or during step b and/or during step c, wherein the sack is obtained according to the process as described herein above.

In one embodiment, at least one part of the aggregates in step a and/or at least one part of the hydraulic binder in step b and/or at least one part of the mineral additions in step c is contained in the sack.

According to a further embodiment, a disintegratable sack is added during step a. Preferably, at least one part of the aggregates in step a is contained in the disintegratable sack. Preferably, the totality of the aggregates in step a is contained in the disintegratable sack.

According to a further embodiment, a disintegratable sack is added during step b. At least one part of the hydraulic binder in step b is preferably contained in the disintegratable sack. Preferably, the totality of the hydraulic binder in step b is contained in the disintegratable sack.

According to a further embodiment, a disintegratable sack is added during step c. At least one part of the mineral additions in step c is preferably contained in the disintegratable sack. Preferably, the totality of the mineral additions in step c is contained in the disintegratable sack.

According to a further embodiment, a disintegratable sack is added during step a and during step b.

According to a further embodiment, a disintegratable sack is added during step a and during step c.

According to a further embodiment, a disintegratable sack is added during step b and during step c.

According to a further embodiment, a disintegratable sack is added during step a, during step b and during step c.

The hydraulic composition obtained by the process makes it possible to produce elements for the construction field.

Shaped articles for the construction field generally comprise any constituting element of a construction, for example a floor, a screed, a foundation, a wall, a partition wall, a ceiling, a beam, a work top, a pillar, a bridge pier, a concrete block, a pipeline, a post, a cornice, an element of road works (for example a border of a pavement), a tile, for example a roof tile, a surfacing (for example of a wall), a plaster board, an (acoustic and/or thermal) insulating element.

Preferably, the contents of the sack of the present disclosure comprise a particulate material, more preferably a hydraulic binder, aggregates or a mineral addition, most preferably a hydraulic binder. According to an embodiment, the contents of the sack may be a hydraulic binder and/or aggregates and/or a mineral addition.

A hydraulic composition is generally a mix of a hydraulic binder, with water (called mixing water), optionally aggregates, optionally additives, and optionally mineral additions. A hydraulic composition may for example be a high performance concrete, very high performance concrete, self-placing concrete, self-levelling concrete, self-compacting concrete, fibre concrete, ready-mix concrete, pervious concrete, insulating concrete, accelerated concrete or coloured concrete. The term "concrete" also comprises concretes which have been submitted to a finishing operation, for example bush-hammered concrete, exposed or washed concrete or polished concrete. Pre-stressed concrete is also covered by the definition. The term "concrete" further comprises mortars. In this specific case "concrete" may refer to a mix of a hydraulic binder, sand, water, optionally additives and optionally mineral additions. The term "concrete" comprises fresh concrete or hardened concrete. Preferably, the hydraulic composition according to the present disclosure is a cement slurry, a mortar, a concrete, a plaster paste or a slurry of hydraulic lime. More preferably, the hydraulic composition is selected from a cement slurry, a mortar or a concrete. The hydraulic composition may be used directly on jobsites in the fresh state and poured into formwork adapted to the target application, or at a pre-cast plant, or used as a coating on a solid support.

The mineral additions are generally finely divided materials used in the hydraulic compositions (for example, concrete) of the hydraulic binders (for example, a cement) in order to improve certain properties or to provide them with particular properties. They may be, for example, fly ash (for example, as defined in the <<Cement>> NF EN 197-1 Standard, paragraph 50.2.4 or as defined in the EN 450 <<Concrete>> Standard), pozzolanic materials (for example, as defined in the <<Cement>> NF EN 197-1 Standard of February 2001, paragraph 5.2.3), silica fume (for example, as defined in the <<Cement>> NF EN 197-1 Standard, of February 2001, paragraph 5.2.7 or as defined in the prEN 13263 <<Concrete>> Standard:1998 or the NF P 18-502 Standard), slag (for example, as defined in the <<Cement>> NF EN 197-1 Standard, paragraph 5.2.2 or as defined in the NF P 18-506 <<Concrete>> Standard), calcined shale (for example, as defined in the <<Cement>> NF EN 197-1 Standard, of February 2001, paragraph 5.2.5), limestone additions (for example, as defined in the <<Cement>> NF EN 197-1 Standard, paragraph 5.2.6 or as defined in the NF P 18-508 <<Concrete>> Standard) and siliceous additions (for example, as defined in the NF P 18-509 <<Concrete>> Standard) or mixtures thereof.

EXAMPLES

Example 1

Different white sack papers were provided with various coatings according to tables 1 and 2 below. The impact of the coatings on disintegratability is shown in table 3.

TABLE 1

Properties of various uncoated sack papers. The grammage of samples A-B and D-F was 80 g/m². The grammage of sample C was 90 g/m².

| Sample, white/ brown | Gurley (s) | Tensile index [MD/CD] (kNm/kg) | TEA index [MD/CD] (J/g) | Cobb 60 s [Top Side/ Wire side] (g/m²) | Disintegratability test 1 (%) | Disintegratability test 2 (%) |
|---|---|---|---|---|---|---|
| A, white | 5 | 70/52 | 2.6/3.1 | 30/28 | 96 | 85 |
| B, white | 5.5 | 69/52 | 2.3/3.0 | 48/56 | 99 | 94 |
| C, white | 5.5 | 65/49 | 2.3/2.8 | 34/43 | 99 | 89 |
| D, white | 5.9 | 68/47 | 2.4/2.8 | 54/61 | 100 | 90 |
| E, white | 5.9 | 66/48 | 2.4/3.0 | 91/90 | 100 | 95 |
| F*, brown | 5.9 | 84/64 | 3.3/3.7 | 28/27 | 32 | N/A |

*Commercial brown sack paper from Mondi

TABLE 2

Properties of various coated paper qualities. The paper of sample B is coated with a single layer (15 g/m²) of a moisture barrier comprising latex and clay. The paper of sample C is coated with two layers (6 + 6 g/m²) of a moisture barrier comprising latex and a hyper-platy clay (weight ratio 1:1.6). The paper of sample D is coated with a pre-coating layer (9 g/m²) comprising CaCO₃ pigment (60% <2 μm) and latex (dry weight ratio 7.4:1) and a moisture barrier coating layer (5 g/m²) comprising latex and the hyper-platy clay (dry weight ratio 1:1.6). The paper of sample E is coated with a pre-coating layer (9 g/m²) comprising CaCO₃ pigment (60% <2 μm) and binder (dry weight ratio 7.4:1) and a moisture barrier coating layer (9 g/m²) comprising latex and the hyper-platy clay (dry weight ratio 1:1.6).

| Sample, grammage | Tensile index [MD/CD] (kNm/kg) | TEA index [MD/CD] (J/g) | Cobb 60 s [uncoated side/ coated side] (g/m²) | Disintegratability test 1 (%) | Disintegratability test 2 (%) |
|---|---|---|---|---|---|
| B*, white 95 g/m² | 72/47 | 2.2/2.6 | 29/24 | 84 | 80 |
| C#, white 102 g/m² | 70/49 | 2.2/2.7 | 26/20 | 81 | 68 |
| D#, white 94 g/m² | 75/44 | 2.2/2.6 | 40/39 | 90 | 89 |
| E#, white 98 g/m² | 68/40 | 2.2/2.4 | 82/46 | 99 | 95 |

*not calendared
calendared

TABLE 3

The difference in disintegratability according to test 1 or 2 between uncoated and coated paper.

| Sample | Δ (Disintegratability test 1) | Δ (Disintegratability test 2) |
|---|---|---|
| B | −15% | −14% |
| C | −18% | −26% |
| D | −10% | −1% |
| E | −1% | 0% |

Disintegratability test 1 was carried out according to the following protocol:
1. Tear paper (dry weight 30.0 g) into pieces of about 1.5 cm×1.5 cm and add them to 2l of water;
2. After 2 minutes, add the paper-water mixture to a laboratory defibrator (L&W);
3. Run 5000 revolutions;
4. Add the contents from the defibrator to a laboratory sieve equipment having sieve openings of 0.15 mm;
5. After completed filtration, collect the retentate;
6. Dry the retentate at 105° C.;
7. Weigh the dried retentate;
8. Calculate the disintegratability (%) using the formula ((30−w)/30)*100, wherein w is the weight (g) of the dried retentate.

Disintegratability test 2 was carried out according to the following protocol:
1. Introduction of the aggregates (coarse first, then fine) in bell (concrete) mixer.
2. Add pre-wetting water (6% of the overall amount) in the space for 30 seconds.
3. Mix for 30 seconds at normal speed and no more than a 45-degree inclination.
4. Pause mixing for 4 minutes for pre-wetting to occur.
5. Add 25 kg cement sack whole in the mixer cavity and mix for 1 minute.
6. Add remaining water in the space for 30 seconds.
7. Mix for 6 minutes.
8. After the end of the mixing, the pass the whole load through a sieve with a mesh size of 4 mm. The passage of the material through the mesh is aided with the use of a water spray, which dilutes and disperses the mixture. Collected the paper that is visible after all the fines have passed the sieve.
9. Put the collected paper in a finer sieve which is itself placed in a container of a similar, slightly bigger size. Add enough water to the container to immerse the collected paper, thus removing cement and other fines previously trapped on it surface. This washing by immersion and whirling action is repeated 3-4 times until the paper is visibly free of foreign material.
9. Dry the washed paper in an oven set at 40° C. for a period of 24 hours.
10. Calculate the disintegratability (%) using the formula ((w1−w2)/w1)*100, wherein w1 is the initial weight of the sack and w2 is the weight of the paper from step 9.

As can be seen in table 3 above, applying a moisture barrier coating directly on the paper layer (samples B and C) substantially decreased the disintegratability, in particular according to test 2, which represent a realistic use of the coated material in a sack that is added to a cement mixer. However, there was no significant decrease in disintegratability according to test 2 when a precoating layer composed mainly of inorganic filler was provided between the paper and the moisture barrier coating.

The best result (95% disintegratability according to test 2) was obtained when the pre-coating and the moisture barrier coating was applied to a paper layer having very high Cobb values for both sides (91/90) and the resulting coated paper still had high Cobb values (82 for the uncoated side/46 for the coated side).

Example 2

In example 2, sacks containing the formulations of table 4 were employed.

"Sack I" comprised two paper plies and had a capacity of 25 kg (400×450×110 mm). The outer ply was composed of the coated paper of Sample E in table 2 above. The inner ply was composed of the uncoated paper of Sample E in table 1 above.

"Sack II" had a capacity of 35 kg (460×520×115/130 mm) and comprised an inner and an outer ply composed of the same papers as Sack I.

"Sack III" comprised two paper plies and had a capacity of 25 kg (400×450×110 mm). The outer ply was composed of the paper of Sample A in table 1 above coated with a barrier layer (8 g/m²) comprising clay and latex (no pre-coating). The inner ply was composed of the uncoated paper of Sample A in table 1.

TABLE 1

Formulations of mortar or concrete.

| | Quantities in kg | | | |
|---|---|---|---|---|
| | Mortar | | | Concrete |
| | A | B | C | D |
| Mix volume (Litres) | 45 | 63 | 45 | 117 |
| CEM I, 52.5N (Saint-Pierre La Cour) | 25 | 35 | | 35 |
| CEM I 52.5N CE CP2 NF Blanc (Le Teil) | | | 25 | |
| Sand 0/1R (St Bonnet) | 24.1 | 33.8 | 24.1 | 46.9 |
| Sand 1/5R (St Bonnet) | 27.4 | 38.4 | 27.4 | 53.2 |
| Corrector sand 0/0.315 (Fulchiron PE2 LS) | 5 | 7 | 5 | 9.74 |
| Coarse aggregate 5/10R (St Bonnet) | | | | 22.5 |
| Coarse aggregate 10/20R (St Bonnet) | | | | 84.7 |
| Water (pre-wetting) | 3.39 | 4.75 | 3.39 | 8.73 |
| Water (gauging) | 7.25 | 10.5 | 7.25 | 12.6 |

Concrete and mortar was produced according to the following protocol:
1. Introduction of the aggregates (coarse first, then fine) in bell (concrete) 350 L mixer;
2. Add pre-wetting water (6% of the overall aggregate amount) over a period of 30 seconds;
3. Mix for 30 seconds at normal speed (24 RPM) and no more than a 45-degree inclination (ideally 20 to 30 degrees);
4. Pause mixing for 4 minutes for pre-wetting to occur;
5. Add 25 kg cement sack whole in the mixer cavity and mix for 1 minute;
6. Add remaining water over a period of 30 seconds;
7. Mix for a period of time (the "wet mixing" time) ranging from 3 to 9 minutes.
8. Stop, transfer the concrete from the mixer and conduct the testing.

Disintegratability performance variation with mix design, sack type and mixing time was examined. The results are shown in table 5.

TABLE 2

Disintegratability performance

| Formulation | Sack mixed into formulation | Wet mixing time in production step 7 | Disintegratability test 2 (%) |
|---|---|---|---|
| A (mortar) | Sack I, 25 kg | 6 min | 95 |
| B (mortar) | Sack II, 35 kg | 6 min | 93 |
| D (concrete) | Sack II, 35 kg | 6 min | 99.5 |
| A (mortar) | Sack III, 25 kg | 3 min | 54.1 |
| A (mortar) | Sack III, 25 kg | 6 min | 84.3 |
| A (mortar) | Sack III, 25 kg | 9 min | 88.2 |

The importance of sack type is illustrated by comparing the performance of sacks I and III at equivalent mixing times (6 minutes) in table 5.

Performance during a period of ageing in exterior storage was also examined.

Ageing was carried out on entire sacks filled at the cement plant using a Rotopacker filling machine (Haver and Boecker). The filled sacks were placed on pallets that were subsequently covered with a polyethylene film (hood). The pallets were transferred to the testing site and placed in an open-air setting under a horizontal cover (roof) to prevent direct exposure to the weather. The climatic conditions to which the sacks were exposed are given in the table 6.

TABLE 3

Climatic conditions of ageing test

| Week | T (° C.) Weekly average | T (° C.) Hourly max | T (° C.) Hourly min | RH (%) Weekly average | RH (%) Hourly max | RH (%) Hourly min |
|---|---|---|---|---|---|---|
| 1 | 13.6 | 22.8 | 5.6 | 79.4 | 93.8 | 56.8 |
| 4 | 3.7 | 8.2 | 0.3 | 87.1 | 93.5 | 74.8 |
| 5 | 0.5 | 5.5 | −6.4 | 81.2 | 92.8 | 60.3 |
| 6 | 0.2 | 7.0 | −5.8 | 87.2 | 92.8 | 69.5 |
| 7 | −0.7 | 10.3 | −6.1 | 91.3 | 97.0 | 66.5 |
| 8 | 8.2 | 14.6 | 1.5 | 81.6 | 94.0 | 41.3 |
| 9 | 7.8 | 14.8 | −1.8 | 80.4 | 94.0 | 52.3 |
| 10 | 7.1 | 11.8 | −0.7 | 84.4 | 95.0 | 64.0 |
| 11 | 9.2 | 14.9 | 2.1 | 79.6 | 95.0 | 49.0 |
| 12 | 6.2 | 11.1 | −1.2 | 87.4 | 95.0 | 59.5 |
| 13 | 3.8 | 8.3 | −4.0 | 88.3 | 94.0 | 71.3 |
| 14 | 4.5 | 8.1 | −0.7 | 83.2 | 94.0 | 58.5 |
| 15 | 6.4 | 12.3 | −2.2 | 78.3 | 93.8 | 46.8 |
| 16 | 7.4 | 16.2 | 0.2 | 78.8 | 94.0 | 50.3 |
| 17 | 7.1 | 14.1 | −0.9 | 80.2 | 94.0 | 50.5 |
| 18 | 6.5 | 14.4 | 1.3 | 79.3 | 93.8 | 42.8 |
| 19 | 7.2 | 19.3 | −1.2 | 74.1 | 93.0 | 33.8 |
| 20 | 8.9 | 17.7 | 0.7 | 76.5 | 94.0 | 47.5 |
| 21 | 11.0 | 23.0 | 1.9 | 73.5 | 94.3 | 36.3 |
| 22 | 8.5 | 18.5 | −0.2 | 68.4 | 93.0 | 34.5 |
| 23 | 13.5 | 20.0 | 5.2 | 70.4 | 92.8 | 44.3 |
| 24 | 13.6 | 24.0 | 2.8 | 67.1 | 94.0 | 31.8 |
| 25 | 9.8 | 18.9 | 0.0 | 66.2 | 92.0 | 34.0 |

The sampling method that corresponds to the study of ageing is as follows: The sampling periods were defined as 0, 4, 8, 13 and 25 weeks. At the end of each period, two sacks were taken for testing. One sack was directly used for concrete or mortar production and the associated tests in the fresh and hardened state (i.e. slump, air content, setting time, compressive and flexural strength). The second sack was opened with care in order to preserve the shape of the cement given by the sack. A few grams of sample at the surface were taken from a depth of about 1 mm and an area of about 20 cm×20 cm. This sample was labelled "surface." Having taken this sample, the rest of the contents of the sack were mixed by hand with a spatula to achieve a homogeneous powder. Cement in this state of mixing was labelled "bulk." The two samples were then submitted for water vapour adsorption measurements.

Common tests on mortar were conducted as per relevant standard, as follows:

Slump: Method based on adapted concrete standard NF EN 12350-2

Air content: NF EN 413-2

Setting time: NF EN 413-2

Compressive strength at 28 days: NF EN 196-1

Flexural strength at 28 days: NF EN 196-1.

Measurement of water vapour adsorption by cement during storage was carried out according to the following.

Water vapour adsorption on the cement grain has been measured using a RC612 multiphase carbon, hydrogen, and moisture analyser. This apparatus quantifies the carbon and hydrogen present in various organic and inorganic samples, and identifies the source of several types of carbon content. The apparatus features a furnace control system, which allows the temperature of the furnace to be programmed from near ambient to 1100° C.

Dependent upon the application, multiple furnace steps can be programmed by the operator and the furnace can be purged with oxygen or nitrogen to create oxidizing or inert conditions in which the carbon and hydrogen present is combusted or volatilized. A secondary oxidation catalyst is included to ensure full oxidation. Infrared detection is used to quantify the result either as a weight percentage or as a coating weight (mg/m$^2$).

When combusted in an oxidizing atmosphere (O$_2$) all forms of carbon (except some carbides such as SiC) are converted to CO$_2$. In contrast organic forms of carbon produce both H$_2$O and CO$_2$. Thus, the presence of organic carbon may be verified by finding coincident peaks in H$_2$O and CO$_2$.

Moisture and carbonate are detected when the sample is combusted in an inert (N$_2$) atmosphere, with the furnace catalyst temperatures at 120° C. In this mode, organic carbon normally is not detected. Additional sources of carbon can often be differentiated by the temperature at which they oxidize or volatilize.

A slow ramping temperature program, from 100° C. to 1000° C. at 20° C. per minute can be used for the analysis of unknown samples. This type of analysis can be used to indicate the temperatures at which the differing forms of carbon are oxidized, thereby enabling the operator to optimize the furnace temperature program to provide more rapid quantitative results for each form of carbon present in this sample type.

The method used specifically to obtain water vapour measurements for the example cited is summarised in table 7.

TABLE 4

| In N$_2$ atmosphere | Target temp (° C.) | Ramp (° C./min) | Stage in seconds | Duration |
|---|---|---|---|---|
| Hydrates step | 300 | | 300 | 300 |
| Portlandite step | 550 | 82 | 180 | 425 |
| Carbonate step | 950 | 120 | 180 | 525 |

The results of the ageing tests are shown in tables 8 and 9, below.

TABLE 5

Results of the ageing tests. In this control case, cement is contained in standard brown kraft valve sack, made of 2 paper plies of 70 g/m2 and a polyethylene barrier film in between.

| | Ageing period (external storage) in weeks | | | | |
|---|---|---|---|---|---|
| | 0 | 4 | 8 | 13 | 25 |
| Formulation | C | | | | |
| Valve sack mixed into formulation | None (Control) | | | | |
| Water vapour adsorbed - Bulk (%) | | 0.74 | 0.85 | 0.93 | 1.08 |
| Water vapour adsorbed - Surface (%) | | 0.81 | 0.84 | 0.89 | 1.34 |
| Slump (cm) | 14 | 18 | 20 | 19.5 | 19 |
| Air | 3 | 2.4 | 2.4 | 2.4 | 2.2 |
| Setting time (Start-finish, in minutes) | 195-270 | 210-330 | 225-333 | | 220-340 |
| Compressive strength at 28 days (MPa)* | 34.0 (3.88) | 34.8 (5.23) | 37.1 (3.63) | 31.1 (1.35) | 32.1 (3.74) |
| Flexural strength at 28 days (MPa) | 8.4 | 7.1 | 7.0 | 6.8 | 7.2 |

*Compressive and flexural strengths are given as averages. The values in brackets are standard deviations.

TABLE 6

Results of the ageing tests, Sack I.

| | Ageing period (external storage) in weeks | | | | |
|---|---|---|---|---|---|
| | 0 | 4 | 8 | 13 | 25 |
| Formulation | C | | | | |
| Valve sack mixed into formulation | Sack I | | | | |
| Water vapour adsorbed - Bulk (%) | | 0.76 | 0.86 | 1 | 1.23 |
| Water vapour adsorbed - Surface (%) | | 0.78 | 0.96 | 1.08 | 1.51 |
| Slump | 14 | 17 | 15 | 15 | 10 |
| Air | 3.1 | 3.3 | 4 | 3 | 2.6 |
| Setting time (Start-finish, in minutes) | 180-285 | 195-315 | 195-345 | 195-345 | 205-370 |
| Compressive strength at 28 days (MPa)* | 37.8 (3.69) | 37.2 (1.20) | 34.5 (3.32) | 37.7 (3.67) | 31.9 (6.78) |
| Flexural strength at 28 days (MPa) | 7.1 | 7.3 | 7.5 | 7.5 | 7.7 |

*Compressive and flexural strengths are given as averages. The values in brackets are standard deviations.

The water vapour adsorption, a marker of ageing as a major cause of the loss of reactivity of cement in storage, remains limited throughout the testing period for the disintegratable sack and close to the values measured for the standard case of brown kraft sack with 2 paper plies and a polyethylene barrier film. Slump values suggest that some slump is lost with time and would therefore require an adjustment, either with the addition of a judicious quantity of extra water or of a water-reducing admixture. Air is also increased somewhat but would be inconsequential in most common applications.

Setting time and compressive as well as flexural strength, taken as reliable indicators of cement reactivity show that during storage the cement contained in disintegratable sacks is essentially unchanged, especially in relation to the base case where cement is contained in standard brown kraft sacks.

The invention claimed is:

1. A multilayered paper material configured to be used in a valve sack for a hydraulic binder, the multi-layered paper material comprising:
   a paper layer, such as a Kraft paper layer, provided on one side with a pre-coating layer; and
   a moisture barrier coating layer,
   wherein the pre-coating layer comprises an inorganic filler and a binder in a dry weight ratio of between 4:1 and 20:1,
   the grammage of the paper layer is 50-140 g/m$^2$, and
   a Cobb 60 value (ISO 535) of an uncoated side opposite to a side of the moisture barrier coating layer is at least 50 g/m$^2$.

2. The multilayered paper material according to claim 1, wherein the inorganic filler comprises a CaCO$_3$ pigment.

3. The multilayered paper material according to claim 1, wherein the inorganic filler to binder dry weight ratio is between 5:1 and 20:1, such as between 5.5:1 and 15:1, such as between 6:1 and 13:1, such as between 6.5:1 and 11:1.

4. The multilayered paper material according to claim 1, wherein the particle size (%<2 μm) of the inorganic filler is less than 80, such as between 40 and 80, such as between 40 and 70, such as between 50 and 70.

5. The multilayered paper material according to claim 1 wherein the paper layer is formed from a paper material and one or both surface(s) of the paper material has/have a Cobb 60 S value (ISO 535) of at least 50 g/m$^2$, such as at least 60 g/m$^2$, such as at least 70 g/m$^2$, such as between 75 and 110 g/m$^2$.

6. The multilayered paper material according to claim 1, wherein the paper layer is obtained from bleached pulp.

7. The multilayered paper material according to claim 1, wherein the barrier coating layer comprises a synthetic rubber, such as styrenebutadiene rubber.

8. The multilayered paper material according to claim 1, wherein the barrier coating layer comprises a platy clay, such as platy kaolin.

9. The multilayered paper material according to claim 1, wherein the Cobb 60 value (ISO 535) of the coated surface is at least 35 g/m$^2$, such as at least 40 g/m$^2$, such as at least 45 g/m$^2$.

10. A multiple-ply valve sack for a hydraulic binder, such as cement, wherein at least one ply, such as an outer ply, is composed of the multilayered paper material according to claim 1.

11. The multiple-ply valve sack according to claim 10 comprising an inner ply and an outer ply, wherein the outer ply is composed of the multilayered paper material according to any one of claim 1, and wherein the inner ply and the paper layer of the outer ply are composed of the same paper material.

12. A method of producing a multilayered paper material disposed in a valve sack for a hydraulic binder, comprising the steps of:
   a) providing a paper layer, such as a Kraft paper layer, wherein the grammage of the paper layer is 50-140 g/m$^2$;
   b) applying a pre-coating composition onto the paper layer to form a pre-coating layer;
   c) applying a barrier coating composition onto the pre-coating layer to form a barrier layer,
   wherein the pre-coating layer comprises inorganic filler and binder in a dry weight ratio of between 4:1 and 20:1, and the multilayered paper material has an uncoated side, wherein the Cobb 60 value of the uncoated side is at least 50 g/m$^2$.

13. The method according to claim 12, wherein the paper layer is subjected to crêping before step a).

14. Use of a sack according to claim 10 to produce a hydraulic composition, such as concrete, wherein the sack contains a hydraulic binder, aggregates and/or mineral additions.

15. A process for the production of a hydraulic composition comprising mixing water, aggregates and a hydraulic binder, wherein a sack according to claim 10 is used, which sack contains the hydraulic binder and/or the aggregates, said process comprising the following steps:
   a) introduction of water and aggregates in a concrete mixer;
   b) introduction of the hydraulic binder; and
   c) optionally introduction of mineral additions and/or other admixtures, wherein the sack is introduced during step a) and/or step b).

* * * * *